UNITED STATES PATENT OFFICE.

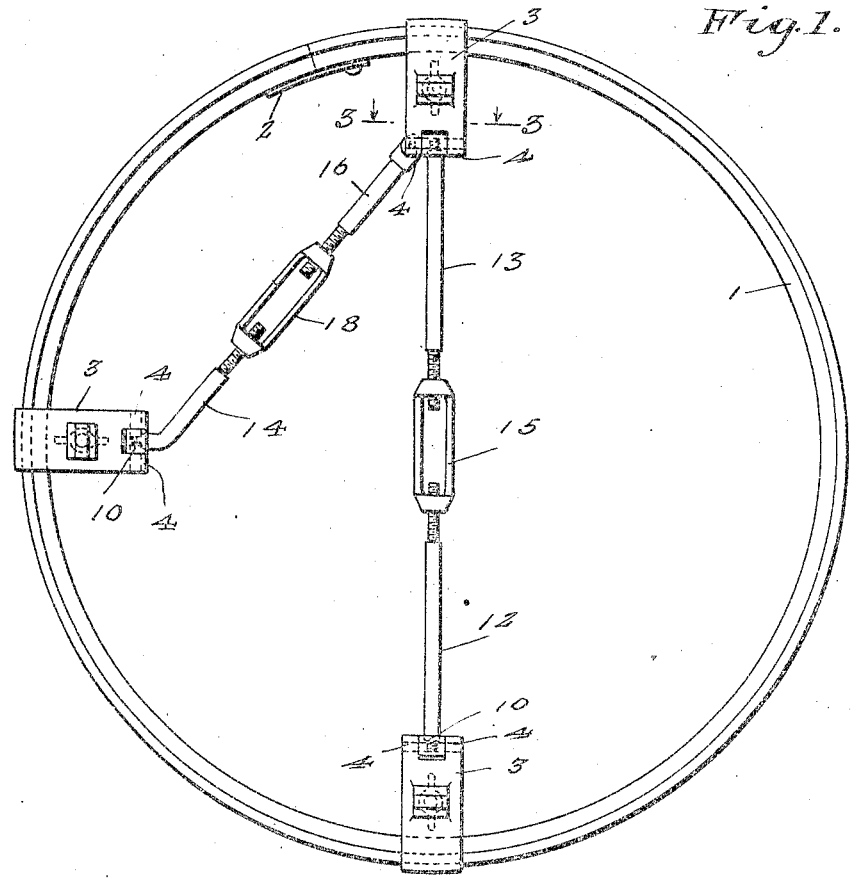
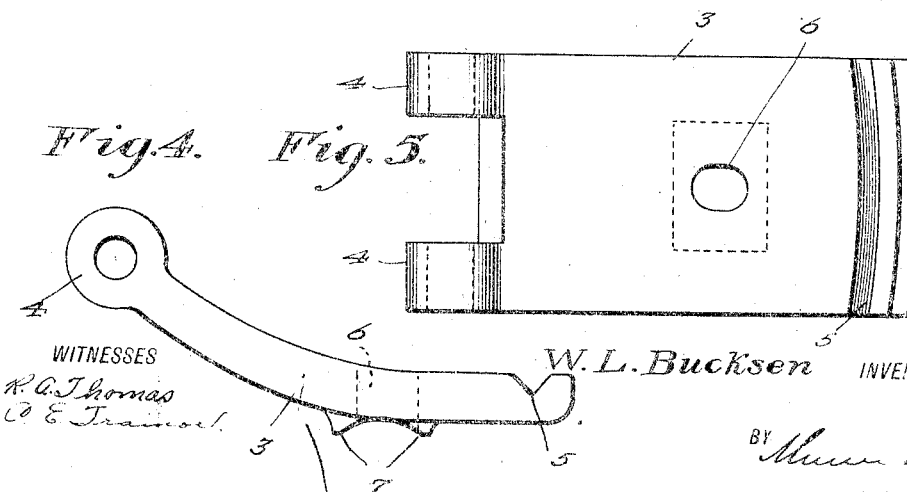

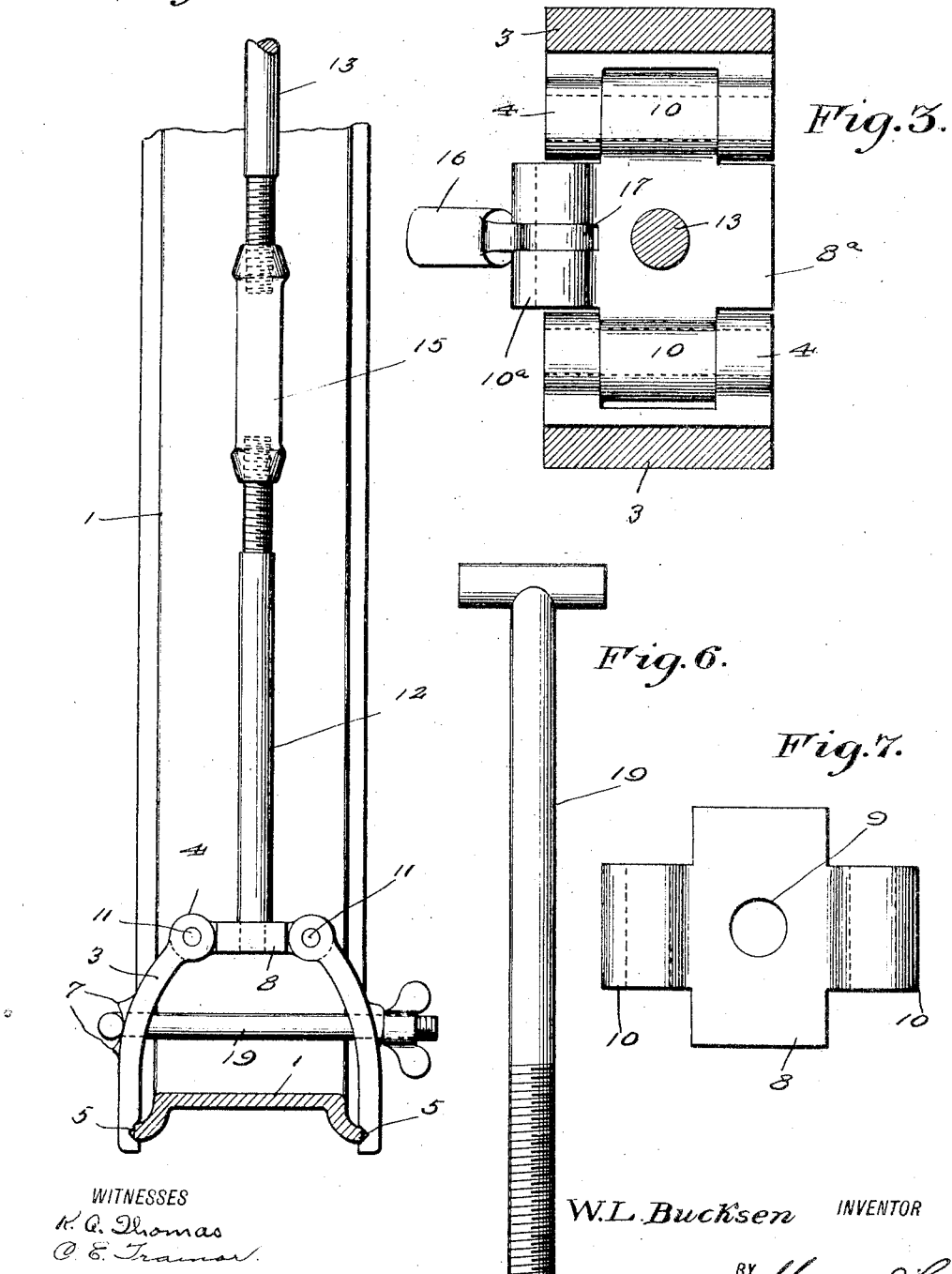

WALTER LEWIS BUCKSEN, OF OAKLAND, CALIFORNIA.

TIRE-CHANGING DEVICE.

1,408,928.  Specification of Letters Patent.  Patented Mar. 7, 1922.

Application filed January 4, 1921. Serial No. 434,907.

*To all whom it may concern:*

Be it known that I, WALTER L. BUCKSEN, a citizen of the United States, and a resident of Oakland, in the county of Alameda and State of California, have invented certain new and useful Improvements in Tire-Changing Devices, of which the following is a specification.

My invention is an improvement in tire changing devices, and the invention has for its object to provide a device of the character specified, for facilitating the changing of tires, and especially adapted for use with the split rims of the quick demountable type of tire, wherein means is provided for first offsetting the ends of the split rim, and for afterwards moving said ends longitudinally with respect to each other to collapse the rim.

In the drawings:

Figure 1 is a plan view of a rim showing the improved device in use,

Figure 2 is a section of a part of the rim showing one of the gripping jaws,

Figure 3 is a section on the line 3—3 of Figure 1,

Figure 4 is a side view of one of the gripping jaws,

Figure 5 is a plan view of the same,

Figure 6 is a plan view of the T-bolt,

Figure 7 is a similar view of the body plate.

The present embodiment of the invention is shown in connection with a split rim 1, whose ends are adapted to abut as shown when the rim is placed upon the wheel, and the ends are prevented from lateral movement with respect to each other by means of a plate 2 which is secured at one end to one of the ends of the rims and laps over the other end.

The improved tool comprises three pairs of gripping jaws, which are especially shown in Figures 2, 3 and 4 and 5. Each of these jaws comprises a plate 3 curved longitudinally as shown in Figure 2, and having at one end a pair of alined laterally spaced bearings 4. At the other end and on the concave face each jaw has a transverse groove 5, the said grooves having side walls which meet at approximately a right angle, as shown.

Each plate is also provided with an opening 6 intermediate its ends, and the said openings are elongated as shown in the direction of the long dimension of the plate. On the convex face and at the opening 6 each plate has a seat or saddle 7 and 7ª, respectively, the opening or slot 6 being at the center of the seat or saddle.

Each pair of jaws 3 is hinged to a T-shaped plate or body 8 or 8ª, each of the said plates 8 having a central opening 9 for a purpose to be presently described, and side bearings 10. The bearings 10 are at the centers of the sides of the body of the plate, and the said bearings are adapted to fit between a pair of bearings 4 for receiving a hinge pin or pintle 11, which hingedly connects the jaws with the body plate 8 or 8ª. The plate 8ª has one of its ends formed into a pair of alined bearings 10ª, but it is otherwise the same as the plates 8.

A rod is connected with each body plate 8 at one end of the rod, the end of the rod being reduced to fit the opening 9, as shown in Figure 2, and these rods are designated at 12, 13, and 14. The rods 12 and 13 are alike, but the rod 14 is provided with an angularly bent portion near the end connected with the gripping jaws, so that the body of the rod lies at an obtuse angle with respect to the long dimension of the gripping jaws.

The end of each rod 12, 13 and 14 remote from the gripping jaws is threaded as shown, and the threaded ends of the rods 12 and 13 are engaged by a double nut 15, the arrangement being such that when the nut is turned in one direction, the rods will be turned toward each other, while when they are turned in the opposite direction, the rods will turn away from each other.

To that pair of jaws which is connected with the rod 13 there is connected a second rod 16 similar to the rods 12 and 13, but of less length. This rod as shown in Figures 1 and 3, has a bearing lug 17 which is received between the bearings 10ª of the plate 8ª, and the rods 14 and 16 have their threaded ends connected by a double nut 18 similar to the nut 15.

The jaws 3 are arranged with the grooves 5 inwardly, that is, the grooves of the two jaws facing, and these grooves are adapted to receive the edges of the rim 1, as clearly shown in Figure 2. The jaws are clamped on the rim by means of a T-shaped bolt 19. This bolt passes through the openings 6 of the jaws of a pair, the T-shaped head resting on the seat or saddle. The other end is engaged by a wing nut 20, and by means of the nut the jaws may be clamped on the rim.

The nut engages the seat 7ª of the other jaw, the seats 7 and 7ª being shaped properly to receive the head and the nut.

In operation, the device is arranged as shown in Figure 1, one of the clamps, namely with which the rods 15 and 16 are connected, being engaged with the rim near the split, and near that end of the split which has the plate 2. That clamp connected with the rod 12 is arranged at a point diametrically opposite the first named clamp, and the clamp connected with the rod 14 is arranged at an interval of 90° from the first named clamps.

When so arranged, the nut 15 is turned until the ends of the rim are offset with respect to each other. Now the nut 18 is turned to draw the rods 14 and 16 toward each other, and it will be obvious that the ends of the split rim will be moved alongside each other to collapse the rim. To extend the tire, the nut 18 is first turned to move the rods 14 and 16 away from each other, after which the nut 15 is turned to move the rods 12 and 13 away from each other.

I claim:—

1. A device of the character specified comprising a series of three clamps adapted to engage a split rim, two of said clamps connected to the rim at diametrically opposite points and connected to each other by a turnbuckle structure for moving the same toward and away from each other, the third clamp connected to the rim at a point substantially midway between the points of connection of the first named pair of clamps, and a turn buckle structure connecting the third clamp and that clamp connected to the rim adjacent the split thereof, said last named turn buckle structure pivotally connected at its ends to the respective clamps and disposed in a substantially diagonal line.

2. A device of the character specified comprising a series of three clamps adapted to engage a split rim, two of said clamps connected to the rim at diametrically opposite points, a turnbuckle connection between these two clamps for moving the same toward and away from each other, a turnbuckle connection between that one of the aforementioned clamps which is adjacent the split of the rim, and the third clamp, each of said clamps comprising a body portion adapted for connection with the turnbuckle members and a pair of jaws hinged at one end to said body portion, said jaws being curved longitudinally and having transverse grooves in their opposing concave faces at their other ends to receive the edge of the rim, and means for forcing together the jaws of the several clamps.

3. A device of the character specified comprising a series of three clamps adapted to engage a split rim, two of said clamps gripping the rim at diametrically opposite points, extensible means connecting said clamps, the third clamp gripping the rim intermediate the gripping positions of the first named pair of clamps, and an extensible connecting member between the third clamp and one of the first named pair of clamps, said connecting member having pivotal connection with the respective clamps.

4. A device of the character specified, comprising a series of three clamps adapted to engage a split rim, a turn buckle connection between two of the clamps for moving said clamps toward and from each other, and a turn-buckle connection between one of the said clamps and the remaining clamp.

WALTER LEWIS BUCKSEN.